United States Patent [19]

Lill

[11] 4,177,397

[45] Dec. 4, 1979

[54] ELECTRICAL CONNECTIONS FOR WINDINGS OF MOTOR STATORS

[75] Inventor: John F. Lill, Harrisburg, Pa.

[73] Assignee: AMP Incorporated, Harrisburg, Pa.

[21] Appl. No.: 887,584

[22] Filed: Mar. 17, 1978

[51] Int. Cl.² .............................................. H02K 11/00
[52] U.S. Cl. ........................................ 310/71; 339/98
[58] Field of Search ...................... 310/71, 42, 91, 270, 310/43; 336/192; 339/97 P, 98, 119 R; 174/72 A

[56] References Cited

U.S. PATENT DOCUMENTS

| | | | |
|---|---|---|---|
| 2,688,103 | 8/1954 | Sheldon | 310/40 MM |
| 3,304,448 | 2/1967 | Lindt | 310/71 |
| 3,780,323 | 12/1973 | Swain | 310/71 |
| 3,979,615 | 7/1976 | Neff | 336/192 |
| 3,984,908 | 10/1976 | Ackley | 310/71 |
| 4,003,128 | 1/1977 | Dochterman | 336/192 |
| 4,132,460 | 1/1979 | Porta | 310/71 |

Primary Examiner—R. Skudy
Attorney, Agent, or Firm—Frederick W. Raring

[57] ABSTRACT

A terminal housing which is intended to be mounted on a motor stator comprises a housing member having a terminal-receiving face and a base surface which is directed in the opposite direction from the terminal-receiving face. The housing has an integral open rectangular mounting frame which comprises arms extending in opposite directions from the endwalls of the housing, parallel legs which extend from the ends of the arms, and a strut which extends between the ends of the legs. The housing and the integral mounting frame are dimensioned such that the housing can be mounted on one face of the stator with the legs extending across the circumferential surface of the stator and with the strut extending across the other face of the stator. When the stator is assembled to the motor housing, the frame is captured by the motor housing and flexed by the surface of the motor housing so that the terminal housing is firmly retained on the surface of the stator face.

7 Claims, 8 Drawing Figures

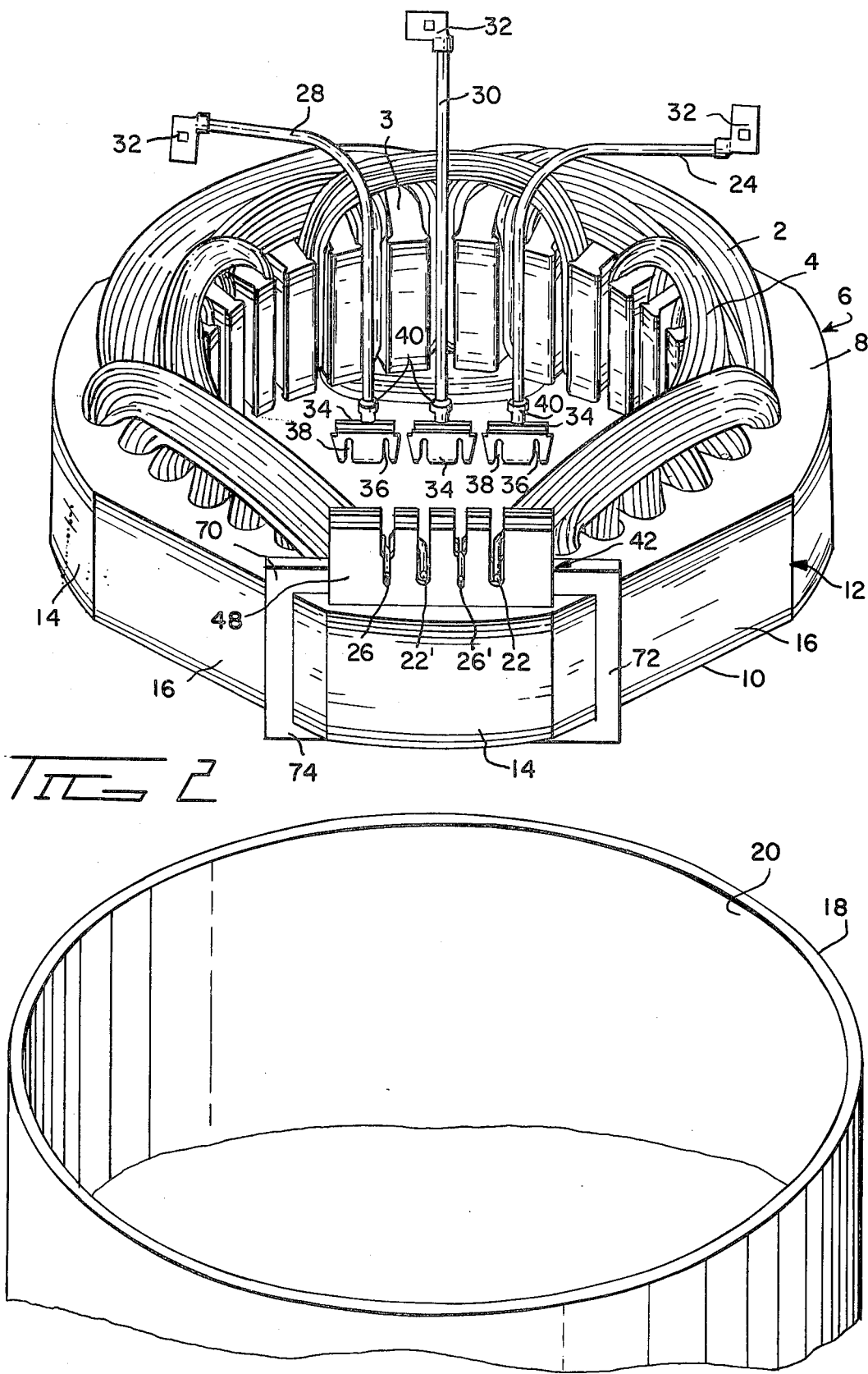

STATOR → CRIMP LEAD WIRES TO COIL WINDINGS → PROVIDE INSULATION ON SPLICE CONNECTIONS → BURY SPLICES IN WINDINGS → DIP → BAKE → ASSEMBLE STATOR TO HOUSING

*Fig. 7* (PRIOR ART)

STATOR → DIP → BAKE → ASSEMBLE HOUSING TO STATOR → INSERT COIL WIRE ENDS AND TERMINALS INTO CAVITIES → ASSEMBLE STATOR TO HOUING

*Fig. 8*

ELECTRICAL CONNECTIONS FOR WINDINGS OF MOTOR STATORS

BACKGROUND OF THE INVENTION

This invention relates to terminal housings of the type which are intended for use on electrical devices having coils thereon and which receive terminals that establish contact with the coil windings. The herein disclosed embodiment of the invention is particularly intended for use on the stator of an induction motor, however, other uses for the principles of the invention will be apparent to those skilled in the art of manufacturing electrical motors.

It is now common practice to form the electrical connections between lead wires and wires in a coil by the use of electrical terminals which have wire-receiving slots that are dimensioned to receive the coil wire and which penetrate the varnish type insulation of the coil wire to establish electrical contact therewith. Terminals of this type also have a means for forming an electrical connection with the lead wire which extends from the coil. U.S. Pat. No. 3,979,615 discloses a housing and a terminal which is adapted to be mounted on the stator of a universal motor, the terminal having wire-in-slot type connecting means which establishes electrical contact with the coil wires and a contact spring arm which serves to establish electrical contact with a lead wire. Application Ser. No. 849,049 filed Nov. 7, 1977 now U.S. Pat. No. 4,132,460, shows another type of terminal housing having an integral mounting means for forming electrical connections to coil windings.

While this wire-slot technique is now in widespread usage in many parts of the electrical industry such as in the manufacture of different types of electrical motors and the manufacture of induction coils, this technology has not been applied to the manufacture of conventional induction motors, probably because of space problems and other manufacturing problems which are associated with conventional induction motors. Current manufacturing practice for conventional induction motors requires that the ends of the coil windings be connected to the lead wires by crimping simple open U-type terminals onto the ends of the coil wires and the lead wires. The splices which are produced by the crimping operation are then insulated by assembling one or two insulating layers to the splices. Thereafter, the insulated splices are buried in the coil windings and the stators are dipped in a liquid varnish-type insulation. The stators are then baked to cure the insulation and thereafter the stators are assembled to motor housings. This manufacturing procedure is a relatively involved process requiring much handling and it results in a high reject rate when the stators are inspected after the baking operation. The handling required for the dipping and baking operations frequently results in disturbance to the electrical splices between the lead wires and the coil windings and the rejected stators must be scrapped or reworked to cure their defects and repair the damage which was produced during the handling period.

The instant invention is directed to the achievement of a terminal housing which can be mounted on the stator after it has been dipped in the liquid insulating material and baked so that the ends of the coil windings can be connected to the lead wires immediately prior to assembly of the stator to the motor housing. The terminal housing is mounted on the stator in a manner such that it is securely held in place after the stator is assembled to the motor housing and cannot be removed from the stator.

It is accordingly an object of the invention to provide an improved terminal housing for wires extending from electrical coils. A further object is to provide a terminal housing having integral mounting means which is intended to be mounted on the stator of an induction motor. A further object is to provide a terminal housing which will simplify and facilitate the manufacture of induction motors.

These and other objects of the invention are achieved in preferred embodiments thereon which are previously described in the foregoing abstract, which are described in detail below and which are shown in the accompanying drawing in which:

FIG. 2 is an exploded view showing an induction motor stator, a motor housing, and a terminal housing in accordance with the invention mounted on the stator.

FIG. 7 is a flow chart which describes the prior art method of forming electrical connections to stator windings and assembling the stator to a motor housing.

FIG. 8 is a flow chart which describes the same manufacturing steps when a terminal housing, in accordance with the invention, is used.

Figure 1:
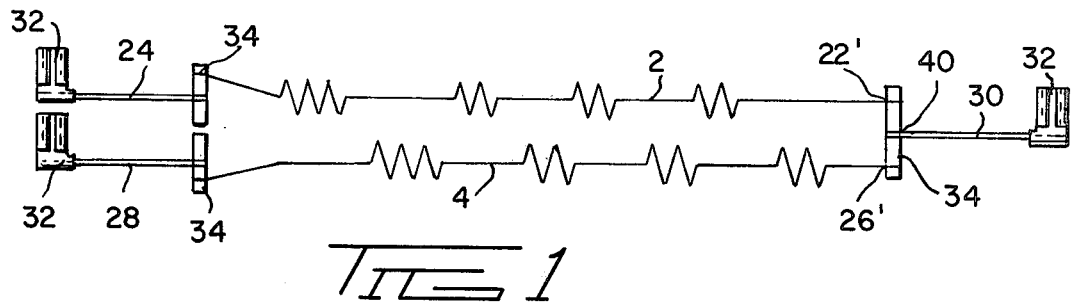
FIG. 1 is a view showing portions of the wiring for an induction motor.

Referring first to FIG. 2, the stator 6 of a typical single phase induction motor comprises a stack of identical stampings which are welded or otherwise secured to each other. The stator has an upper face 8, lower face 10, a circumferential surface 12 and a central opening as shown. Spaced apart teeth 3 extend inwardly into the opening and main and auxiliary windings 2, 4 are provided with the turns of the windings extending through the gaps between selected adjacent teeth. Ordinarily, the main winding 2 will be of a relatively heavier gage wire than the auxiliary winding 4 and both of the windings are composed of wires provided with a varnish-type insulating coating thereon, for example, polyvinyl formal resin. The circumferential surface 12 has arcuate portions 14 at evenly spaced intervals and these arcuate portions are separated by flat portions 16. The stator in the completed motor is contained in a cylindrical housing 18 which has an integral surface 20 against which the arcuate portions 14 are disposed as shown in FIG. 7. This arrangement of having the surfaces 14 against the surface 20 results in good heat transfer and heat dissipation and minimizes the outside dimensions of the motor.

As shown in FIG. 1, one end 22 of the main winding 2 is connected by means of terminal 34 to a lead wire 24 and one end 26 of the auxiliary winding 4 is connected to a lead wire 28 by a terminal 26. The other ends 22', 26' of the main and auxiliary windings are connected commonly to a terminal 34 which is connected in turn to a lead wire 30. All of the lead wires have flag-type quick disconnect terminals on their ends and they are connected to their respective terminals 34 by crimped connections 40.

Each of the terminals 34 in the disclosed embodiment comprises a U-shaped member having one slot means 36 which is dimensioned to receive and establish electrical contact with the relatively finer gage auxiliary coil wire 4 and another slot means 38 which is dimensioned to receive and establish electrical contact with the wire of the main winding 2. The manner of establishing the electrical connections is briefly described here and is described in greater detail in application Ser. No. 887,585 filed filed Mar. 17, 1978. The instant invention is concerned primarily with housing 42 and integral mounting means 44 and with the manner of retaining this housing on the stator when the stator is assembled to the motor housing 18.

Figure 3:
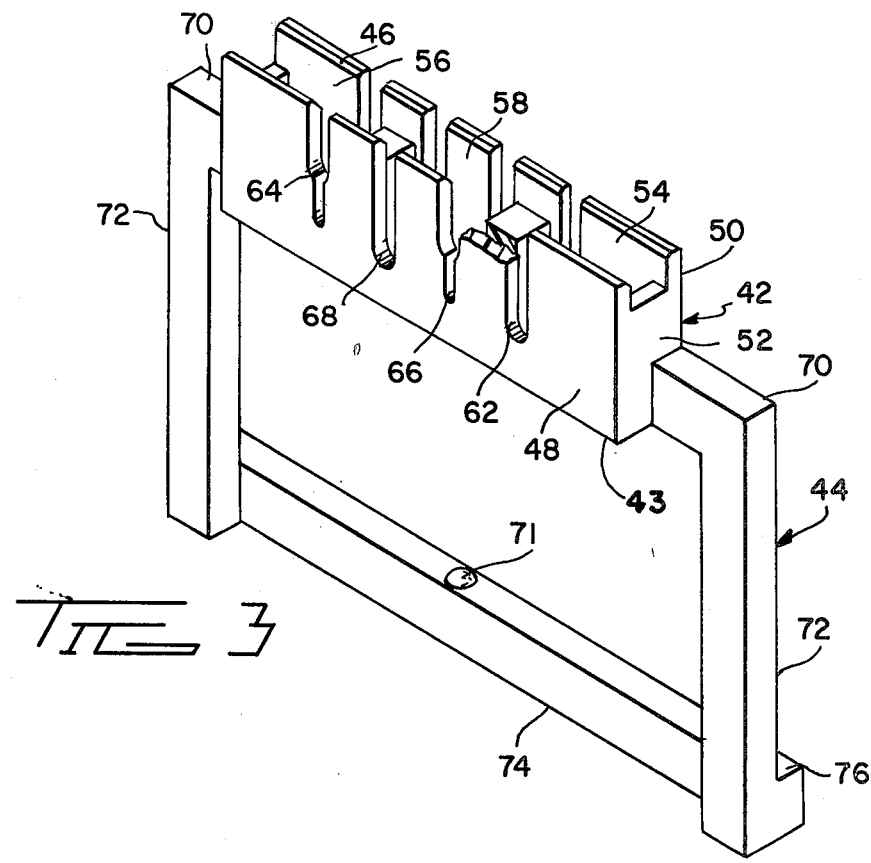
FIG. 3 is a perspective view of a terminal housing in accordance with the invention.
Figure 4:
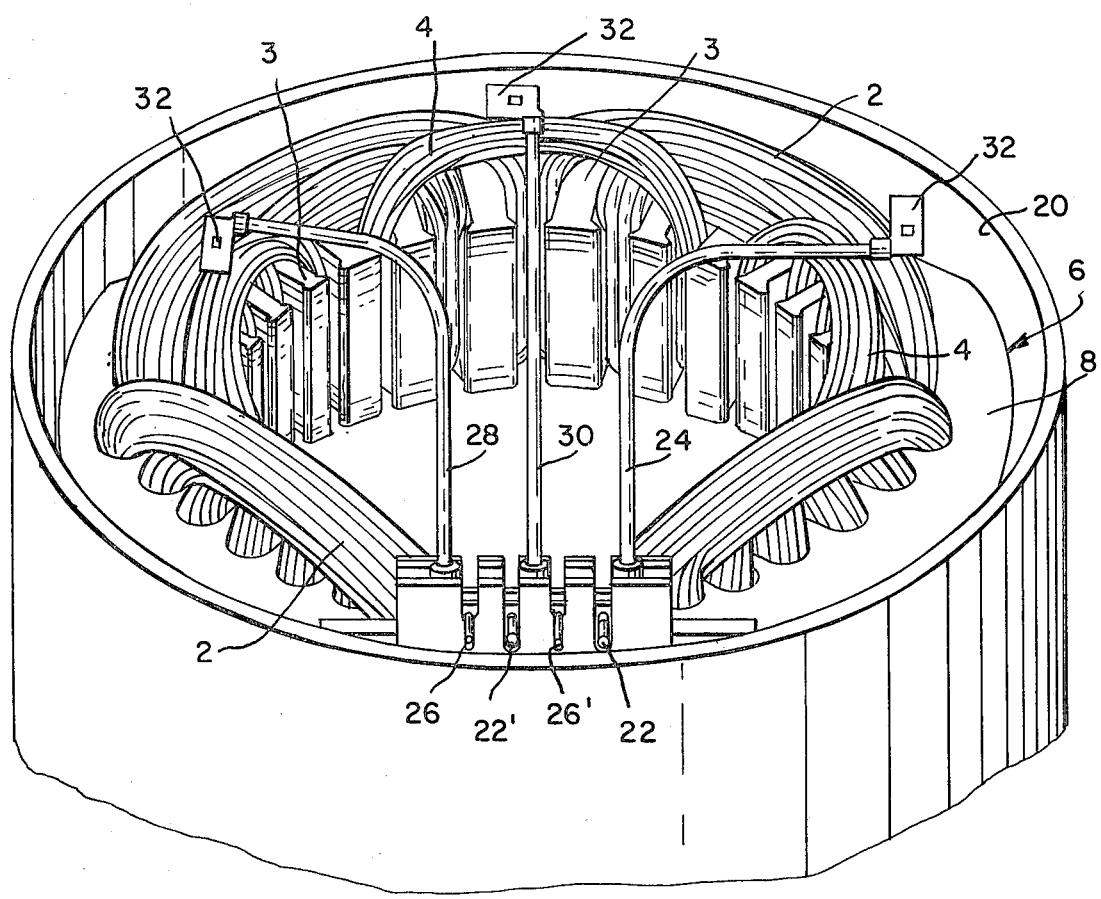
FIG. 4 is a view similar to FIG. 2 but showing the stator and housing assembled to each other.

As shown in FIG. 3, the housing 42 is generally rectangular on all surface portions thereof and has a terminal-receiving face 46 and a base surface portion 43 which is parallel to, and spaced from, the terminal-receiving face. Sidewalls 48, 50 and endwalls 52 extend between the base surface 43 and the terminal-receiving face and cavities 54, 56, 58 extend into the housing from the terminal-receiving face. These cavities are identical and are dimensioned to receive a contact terminal of the type shown at 34, adjacent cavities being separated from each other by barrier walls 60. Wire-admitting slot means 62 are provided in the sidewalls 48, 50 in communication with the cavity 54, the slot means 62 being dimensioned to receive the relatively coarse main winding wire 2. A slot means 64 in the sidewalls opens into the cavity 56 and is dimensioned to receive the relatively finer auxiliary winding wire 4. Two aligned pairs of slots 66, 68 in the sidewalls communicate with and open into the center cavity 58 so that the ends 22', 26' of both windings can be positioned in the slot means 66, 68. After the wires of the windings are so positioned, the terminals 34 can be inserted into the cavities and upon such insertion, the ends of the coil wires will move relatively into the slots 36, 38 of the terminals and establish electrical contact with the wires.

The mounting means 44 for the housing 42 comprises arms 70 which extend from the endwalls 52 of the housing, parallel legs 72 which extend downwardly, as viewed in FIG. 3, and away from the housing 42, and a strut 74 which is integral with and extends between the ends of the legs. It will be noted that the strut 74 is offset from the housing as shown at 76, an arrangement which permits manufacture of the housing in mounting means as a relatively simple injection molding having core pins and mold parts which move in any one direction. In other words, it is unnecessary to have core pins moving laterally of the legs 72 in the mold which is used to produce the housing. A dimple or boss 71 is provided on the upwardly facing surface of the strut 74 for reasons discussed below.

In use, and when it is desired to connect the ends of the windings 22, 22', 26, 26' to the lead wires 24, 28, 30, it is merely necessary to place the housing on the stator with the surface 43 on the face 8 and with legs 72 extended across portions 16 of the circumferential surface which are on each side of one of the arcuate portions 14. Thereafter, the ends of the coil windings are positioned as shown in FIG. 2, in the wire-admitting slots 62, 64, 66 and 68. The terminals 34 having the lead wires crimped thereto are then inserted into the cavities thereby to connect the lead wires to the ends of the coil wires in the manner shown in FIG. 1. The stator 6 is then assembled to the housing as shown in FIG. 5 and the assembled stator and housing can then be carried to a subsequent work station for assembly of the rotor to the motor.

Figures 5, 6:
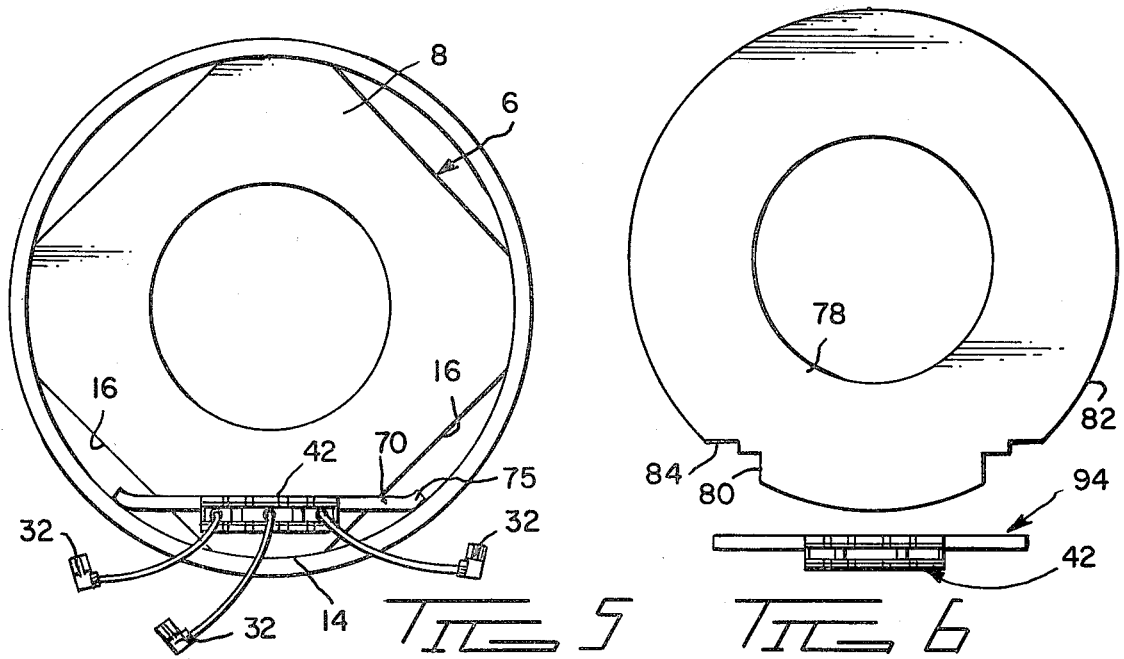
FIG. 5 is a top plan view of the stator and housing, the coil windings being omitted in the interest of clarity.
FIG. 6 is a plan view of an alternative form of stator.

As shown in FIG. 5, it is desirable to dimension the mounting means 44 such that the edges 73 of the legs 72 will bear against the internal surface 20 of the housing and the distance between these edges should be slightly greater than the chordal length of the contact points or lines of the edges and the housing. When the mounting means is so dimensioned, the legs 72 and some portions of the arms 70 and the strut 74 will be flexed as indicated in FIG. 5 at 75, and the housing will be clamped and firmly held on the face 8 of the stator. This mounting arrangement ensures that the electrical connections will not be subjected to vibration or shock damage when the motor is put in use.

The previously identified dimple, or boss 71 on the upwardly facing surface of the strut 74 is provided in order to permit the mounting frame to be mounted on stators which lie within a range of thicknesses. In this connection, it should be explained that the manufacturing specifications for a motor stator permit a relatively wide tolerance in the thickness of an acceptable stack of laminae. This wide tolerance is necessary as a practical matter because of the fact that the thickness of the stator is equal to the sum of the thicknesses of all of the individual laminae in the stator and may also be influenced to some extent by the condition of the surfaces of the laminae. It is not uncommon, for example, for manufacturing specification to permit a variation of as much as 0.05" in the stator thickness where the normal thickness is about 1.25". The boss 71 should therefore be dimensioned such that it will bear against the lower face 10 of a stator which lies at the lower end of the acceptable tolerance range for the stator thickness and the mounting frame is deformed when the housing is mounted on a stator having a thickness equal to the upper limit of the tolerance range. The deformation of the frame is absorbed by the strut 74 and may also be absorbed by the legs 72 and the arms 70. The housing and integral mounting frame should therefore be of a material which is capable of undergoing such deformation when required, for example, an unfilled nylon which is relatively firm in thick sections but which will withstand flexure in elongated relatively thin sections.

FIGS. 7 and 8 demonstrate the manufacturing advantages which are realized when stators are manufactured using terminal housings and frames in accordance with the invention. In accordance with prior art practice (FIG. 7) the stator having the windings 2, 4 thereon is connected to the lead wires 24, 28, 30 by crimping the ends of the coil wires and the ends of the lead wires in relatively simple open U-type connecting devices. Since these connecting devices are not insulated, it is necessary to assemble one or more insulating coverings to the crimped connections. Thereafter, the crimped connections are buried in the windings or otherwise suitably located in a strain relief means in the central opening of the stator. The stator is then dipped in a liquid resin and subsequently baked to solidify and polymerize the resin. Thereafter the stator and housing can be assembled to each other. Because of the extensive handling required in making the crimped connections, assembling the insulation to the crimp connections, burying the crimp connections in the winding and the dipping and baking steps, a high reject rate is suffered by induction motor manufacturers and an unduly high number of the stators must be rejected or reworked after the baking operation.

As shown by FIG. 8, in accordance with the principles of the instant invention, the stator is dipped in the resin and baked prior to assembly of the housing 42 to the stator. Assembly of the housing to the stator, positioning of the ends of the coil wires in the housing, and insertion of the terminals 34 into the cavities, can be carried out as a series of steps which are closely related in time and the stator is not subjected to extensive handling after the electrical connections are made, but it can be immediately assembled to the motor housing. This simplification of the manufacturing process reduces the amount of labor involved in the process and also greatly reduces the reject rate of the wire stator.

The principles of the invention can be applied to a wide variety of circumstances. For example, FIG. 6 shows a stator having a cylindrical surface 82 which would be against the surface 20 of housing. If it is desired to employ the principles of the invention with a stator of the type shown in FIG. 6, it is merely necessary to provide spaced-apart notches 80 having parallel surfaces 81. The mounting means 44 can then be assembled to the stator as described above. In order to achieve the locking effect shown at 75 in FIG. 5, the notches may be stepped as shown at 84 so that the legs 72 will have clearance for flexure as shown in FIG. 5.

What is claimed is:

1. In an electric motor sub-assembly of the type comprising a hollow cylindrical motor housing, a stator disposed in said housing and coil windings on said stator, said stator having oppositely directed faces and an external circumferential surface, said circumferential surface having arcuate portions which are against internal surface portions of said housing, and having portions which are adjacent to said arcuate surface which are spaced from said internal surface of said housing, the improvement to said sub-assembly comprising:
   a terminal housing mounted on one of said faces of said stator, said housing comprising an elongated block of insulating material having a terminal-receiving face and having terminal-receiving cavities extending into said terminal-receiving face, said housing extending across said face at a location adjacent to one of said arcuate portions,
   integral retaining means extending from said housing, said retaining means comprising parallel spaced-apart legs extending from said housing and an integral strut extending between the ends of said legs, said legs extending across said adjacent portions of said circumferential surface on each side of said one arcuate portion, said strut extending across the other one of said faces whereby, said housing and retaining means are captured on said stator by said arcuate surface portions of said stator and said internal wall portion of said housing.

2. A motor sub-assembly as set forth in claim 1, said retaining means comprising parallel spaced-apart legs extending from said housing and an integral strut extending between the ends of said legs, said legs extending across said adjacent portions of said circumferential surface on each side of said arcuate portions, said strut extending across the other one of said faces.

3. A motor sub-assembly as set forth in claim 1, said housing having a base surface, said base surface being on said one face, said base surface and said terminal-receiving face being oppositely directed.

4. A motor sub-assembly as set forth in claim 3, said housing having parallel sidewalls and parallel endwalls extending between said base surface and said terminal-receiving face, arm portions extending from said endwalls, said arm portions being integral with said legs.

5. An electric motor sub-assembly as set forth in claim 1, said legs being snugly against said internal surface of said housing, said retaining means being resiliently deformed by said housing whereby said housing is firmly and immovably held on said stator.

6. In an electric motor sub-assembly of the type comprising a hollow cylindrical motor housing, a stator disposed in said housing and coil windings in said stator, said stator having oppositely directed faces and an external circumferential surface, said circumferential surface having arcuate portions which are against internal surface portions of said housing, portions of said surface which are adjacent to said circumferential surface being spaced from said internal surface of said housing, the improvement to said sub-assembly comprising:
   terminal housing means having integral mounting means,
   said terminal housing means comprising a generally rectangular block of insulating material having a base surface and a terminal-receiving face, said base surface and said terminal-receiving face being oppositely directed, oppositely directed sidewalls and oppositely directed endwalls extending between said base surface and said terminal-receiving face,
   said mounting means comprising an open frame extending from said endwalls, said frame having spaced apart parallel legs and a strut member extending between said legs at the ends thereof,
   said base surface of said terminal housing means being on one of said faces and extending as a chord with respect to said arcuate portions of said circumferential surface, said parallel legs extending across said portions of said circumferential surface which are adjacent to said arcuate surface portions, said strut member extending across the other face of said stator,
   said windings having lead wires extending to said terminal-receiving face and being in electrical contact with terminals disposed in cavities which extend into said terminal-receiving face.

7. A motor sub-assembly as set forth in claim 6, portions of said frame being flexed by said internal walls of said motor housing whereby said terminal housing and said mounting means are clamped to said stator and said housing is held immovably on said stator.

* * * * *